United States Patent Office 3,241,613
Patented Mar. 22, 1966

3,241,613
SHUTTING OFF WATER IN VERTICAL FRACTURES
Loyd R. Kern, Irving, and Reece E. Wyant and Thomas K. Perkins, Dallas, Tex., assignors to The Atlantic Refining Company, Philadelphia, Pa., a corporation of Pennsylvania
No Drawing. Filed Feb. 19, 1962, Ser. No. 174,284
16 Claims. (Cl. 166—29)

This invention relates to the treatment of wells utilized in oil and gas production. More specifically, this invention pertains to vertical formation fracturing wherein the rate of fluid production from or fluid injection into the lower portion of a vertical fracture is not increased as much as it is in the upper portion of the fracture. Even more specifically, this invention concerns vertical fracturing of oil and gas wells to increase oil production without proportionally increasing the water production therefrom.

In oil and gas production, it is common practice to improve the rate of production of or the rate of injection into wells by creating new fractures or by extending old fractures in oil and gas wells. Generally, a fracture is created by disposing a fracturing fluid opposite the formation to be fractured. After the fracturing fluid is spotted opposite the formation to be fractured, sufficient pressure is applied to the fracturing fluid to cause it to crack the formation thereby forming a fracture therein, or thereby opening a pre-existing fracture. Usually, some portion of the fracturing fluid will contain a fracture propping agent. Leak-off or subsequent removal of the fracturing fluid will then deposit the propping agent between the walls of the fracture and the fracture will be propped at least partially open when the pressure of the fracturing fluid is reduced. The permeability through the propping agent deposited in the fracture is usually greater than through the unfractured formation; therefore, the ease with which the fluids can be produced from or injected into the formation containing such propped fractures is improved.

Unfortunately, the oil or gas formations which are to be fractured frequently overlie an adjacent undesirable water producing zone whose rate of production is increased when the oil or gas producing formation is fractured. Increasing the undesirable water production in oil or gas wells causes many producing problems well known to those skilled in the art. This is especially true in oil wells wherein the oil undergoes bottom water drive. It is, therefore, desirable to provide a fracturing technique that causes a minimum of increase of the undesirable water production of oil or gas wells or mixtures thereof. Similarly, in some injection wells, it is desirable to fracture only upper zones of a multiple zone formation so that the rate of injection into only these zones is increased. Since, however, in a single formation, it is usually difficult to adequately control the vertical height of a fracture, usually, any attempt to fracture these particular zones will also result in a fracture of lower zones. It is desirable, therefore, to also provide a fracturing technique that increases the rate of injection into upper zones more than it increases the rate of injection into lower zones.

Accordingly, an object of this invention is to provide methods and compositions for increasing the permeability of subsurface earth formations without a proportional increase in the production of undesirable fluids.

A further object of this invention is to provide compositions and methods for vertical fracturing of subsurface earth formations wherein the permeability of a lower portion of the fracture is not increased as much as it is in the upper portion of the fracture.

Another object of this invention is to provide methods of vertically fracturing oil and gas wells wherein the rate of oil or gas production is increased without increasing the water production to the same extent.

These and other objects and advantages of this invention will become apparent by reference to the following description and appended claims.

This application is related to U.S. Patent application, Serial No. 659,496, filed May 6, 1957, in the name of William J. McGuire, Jr. et al., now Patent No. 2,950,247; U.S. patent application, Serial No. 51,149, filed August 22, 1960, in the name of William J. McGuire, Jr. et al., now U.S. Patent No. 3,155,159; and U.S. patent application, Serial No. 88,635, filed February 13, 1961, in the name of William J. McGuire, Jr. et al., now Patent No. 3,164,208, all assigned to the same assignee as the present application.

Briefly, this invention covers methods and compositions for vertically fracturing a subsurface earth formation traversed by a well bore wherein the permeability to fluid flow in a lower portion of the vertical fracture is not as great as the permeability to fluid flow in the upper portion of the fracture. The reduced permeability to fluid flow through the lower portion of the fracture is attained by first depositing in the lower portion of the fracture a mixture of relatively large size propping particles having a rapid settling rate in the fracturing fluid and relatively small pore sealing particles whose settling rate is usually low. The large size size propping particles have a size greater than the size of the openings of a U.S. Sieve Series No. 60 screen and the small pore sealing particles, which are composed of a different material from the large size propping particles, have a size less than the size of the openings of a U.S. Sieve Series No. 80 screen. On the other hand, the upper portion of the fracture is propped open with relatively large particles without any small plugging particles so that the permeability to fluid flow through the upper portion of the fracture is greater than that through the lower portion. In one aspect of this invention, before the proppant is placed in the upper portion of the fracture, this upper portion is overflushed with a liquid containing no particles so as to remove any small plugging particles left in the upper portion after depositing the plugging pack in the lower portion of the fracture. In another aspect of this invention, a sparse population of large particles is placed in the upper portion of the fracture with or without overflushing the small plugging particles from that part of the fracture and any small plugging particles left in the upper portion of the fracture are removed as the formation is produced because the small particles will flow between the relatively large openings between the particles of the sparse population. In yet another aspect of this invention, before the mixture of small and large particles is placed in the fracture, the fracture walls are treated with a leak-off control fluid.

Broadly, this invention describes compositions for reducing the flow of fluids through through the lower portions of vertical fractures and methods for utilizing these compositions in oil or gas wells or combinations thereof. The vertical fractures can be either newly created fracture or pre-existing, natural or manufactured fractures. The vertical fractures can communicate with one or more horizontal fractures. The fractures can be concerned with formations from which fluids are produced or formations into which fluids are injected. In other words, these compositions are useful whenever and wherever it is desirable to reduce the flow of fluids through the lower portion of a vertical fracture. The fluids can be oil, gas, water or mixtures thereof depending upon the nature and utility of the well and formation concerned, but these compositions are particularly suited to reducing water flow. As stated, one phase of this invention concerns compositions for reducing the flow of fluids through the lower portion of a vertical fracture. The compositions comprise a mixture of a carrier fluid, a first solid, particle-form material having a size greater than the size of the openings of a U.S. Sieve Series No. 60 screen and especially noted for having a relatively rapid falling or settling rate in said carrier fluid and for its volume filling capacity per particle, and a second, particulate solid having a size less than the size of the openings of a U.S. Sieve Series No. 80 screen and especially noted for its small size and pore filling qualities. Within the limits specified herein, both of the solid materials may be made up of particles of varying sizes. The two solid materials are of different chemical composition. In general, in operation, the two particle-form materials are deposited from the carrier fluid and form a relatively impermeable pack in the lower portion of a vertical fracture. The two particle-form substances are selected to coact in such way as to aid in settling or depositing of both particle-form substances and to combine or interdisperse to form a relatively non-porous pack. This invention, therefore, utilizes a combination of small and large solid particles to deposit a relatively fluid impermeable mass or pack of solid particles in the lower portion of a vertical fracture. The height of the pack to be formed depends on the vertical length of undesirable portion of the vertical fracture. For example, if the vertical fracture extends into an undesirable water zone, this undesirable portion of the fracture can be shut off to reduce the increase in water production. The combination of particles, therefore, may be utilized to fill and plug the lower portion of the fracture and to reduce both longitudinal and vertical fluid flow inside the lower portion of the fracture. The combination of small and large particle-form solids is important since the larger propping particles by themselves would form a permeable pack and increase the fluid flow in the lower portion of the fracture. The small particles by themselves are not suitable as sole plugging materials since their settling rate is usually too low to enable them to be used in different fracturing fluids and at different flow rates. For example, if sufficient concentration of small sealing particles were used to fill the lower portion of the fracture and the particles did not settle properly, the permeability of the whole fracture might be reduced; moreover, any attempt to prop the upper part of the fracture would remove the small particles from the lower part. In addition, the small pore sealing particles are usually expensive in comparison to the larger particles of the first solid and the use of small particles by themselves would greatly increase the cost of sealing the lower portion of the fracture. By combining the two solids, therefore, the two solids coact to aid each other in such a way as to cause the small particles to be collected in the pack, to form an impermeable pack, and to fill the fracture without the need for a large concentration of small, expensive type materials.

Herein, the carrier fluid for the solid particle-form material just mentioned is any fluid suitable for fracturing subsurface earth formations and includes such fluids as hydrocarbons, water, crude oil, acids, kerosene, emulsions and gels of these fluids and mixtures thereof, fluids with either low or rapid leak-off properties, and the like. The selection of a particular carrier fluid depends on the physical and chemical properties of the system which are usually considered in selecting a specific fracturing fluid, which properties include such items as the depth of the formation to be treated, the available pumping rates, the particle-form and particulate solids utilized, the vertical length and width of the fracture, the nature of the formation, and the fracturing pressure. The volume of carrier fluid utilized in any one treatment will vary according to the concentration of solids and their settling rate, the carrier fluid flow rate, vertical length and width of the fracture, nature of the formation and other similar characteristics. The essential qualities of the carrier fluid are that it must be suitable for carrying the solids to and depositing the solids in the fracture while maintaining the desired fracture width or opening.

The first solid material is a particle-form propping solid particularly selected to provide adequate volume filling capacity per particle at a minimum of cost and has a particle size greater than the size of the openings of a U.S. Sieve Series No. 60 screen. The first, particle-form solid will usually be made up of a limited range of particle sizes. The maximum size of the particles will be largely controlled by the maximum fracture width in that portion of the fracture that is to be shut off, which width may or may not equal the maximum width of the fracture. If larger particles were used, other portions of the fracture might also be sealed or the particles might not enter the fracture. This maximum will usually be less than one-quarter (0.25) of an inch. Moreover, the maximum particle size will usually not exceed the size of the particles that are used to prop the upper, unplugged part of the fracture. It has been found that if the maximum particle width or diameter does not exceed this maximum that the particles will not be large enough to form a bridge in the fracture before enough particles settle from the carrier fluid to form the desired layer in the lower portion of the fracture. It has also been found that a mixture of particle sizes smaller than the maximum limit is often desirable provided that all of the particles of the first particle-form solids settle at the rates hereinafter described. A mixture of first particle sizes within this limit assures that all of the lower and narrower portions of the fracture will be filled.

For this invention, the smallest size particles of the first particle-form solid should not pass through a U.S. Sieve Series No. 60 screen. Particle-form solids are readily available in the size ranges mentioned. It is realized that commercially available materials may contain minor amounts of finer particles in any given mixture, but the amounts of such finer solids present are small in relation to the amount of the desired size particles and these finer particles are not suitable for this invention. The small amount of such finer solids present is not taken into consideration in planning and carrying out this invention since such particles are, for our purposes, negligible.

In some instances where the maximum fracture width is not obtained immediately, it is preferred to add a narrow range of small particles first and gradually increase the size range to cover the above-described mixture of sizes as the fracture widens. In other instances, moreover, it is best to complete the shut-off process with particles of reduced diameter since in some fractures the final area to be sealed will be near the end of the fracture where the fracture narrows. This largely depends upon how much of the vertical length of the vertical fracture is to be filled and how deep the fracture extends horizontally into the formation. Usually, however, a particular particle size range can be preselected.

The first, particle-form propping solid material may be any relatively inexpensive, solid material with sufficient density and particle size to rapidly settle from the carrier fluid. Naturally, the rate at which the solid particles of this first material settle is partially controlled by the physical properties of the carrier fluid, e.g., density, viscosity and flow rate. For this invention, all of the particles of the first, particle-form solid material must have a falling or settling rate of at least 0.1 foot per minute in said carrier fluid. For a given carrier fluid and flow rate, this feature limits the size of the smallest particles of a specific material for the first particle-form material. It is preferred that the largest particles of the first, solid particle-form material have a falling rate exceeding 2 feet per minute, and falling rates as high as 40 feet per minute can be utilized when the fracture width and fluid flow rate are large. Preferably, however, the falling rate of the largest particles of the first particle-form solid material will be between 2 feet and 20 feet per minute.

Some solid materials which are suitable for the first, particle-form propping solid material are sand, aluminum, iron or steel, plastic, nut shells and seed pits of the proper density and size, and any other solid material having the qualities mentioned previously. Sand particles are preferred for most carrier fluids since sand is readily available in the sizes mentioned, is relatively dense, and is inexpensive. The settling or falling rate of the first solid material in the carrier fluid is readily controlled by adding or mixing chemicals or other fluids with the carrier fluid which additives or mixtures control the rate of settling of the first solid material. For example, if the carrier fluid is water and the solid material is sand, usually no additive is needed since the settling rate is usually satisfactory. If a slower settling rate is desired, any of the many well known methods for reducing the settling rates of particles in a fluid may be utilized. One example is a water-soluble gum which when added to the water thickens the water and reduces the settling rate of the particles. Another example is to form an emulsion of water and other fluids to reduce the settling rate of the particles.

The concentration of first particle-form propping solid in the carrier fluid may be varied to conform to operating conditions. The concentration will not exceed 10 pounds of solid particles per gallon of carrier fluid.

The second, particulate sealing solid material is especially selected because of its small particle size and its pore filling or sealing characteristics. Unlike the particles of the first solid material, the second particulate material may or may not settle rapidly from the flowing carrier fluid. Normally, because of their small size and composition, they will not settle rapidly. It has been found that the largest size particles of the second solid should not be larger than three-fourths of the smallest size particles of the first solid material. For example, the first particle-form propping solid should have a size greater than the size of the openings of a U.S. Sieve Series No. 60 screen and all of the particles of the second particulate sealing solid should pass through a U.S. Sieve No. 80 and at least 30 percent of the second particulate material will be in the fine size powder range U.S. Sieve Series No. 200 or smaller).

The concentration of second particulate sealing material is largely dependent upon the concentration of the particles of the first, particle-form solid material. In general, it has been found that the volume of second particulate material should be between one-tenth and equal to the volume of the first, particle-form solid material. Preferably, in most fractures, the volume will be between one-fourth and one-half that of the first, particle-form solid material and must in all cases be present in an amount sufficient to seal the openings between the deposited particles of the large-size propping particles. If amounts less than the minimum are used, there is not enough small particle material to assure complete sealing of the voids of the first particle-form material. Usually, there is no harm in slightly exceeding the amount of second particulate solids needed, but an excess of small second particulate material, in addition to being uneconomical, could have harmful plugging effects on the upper portion of the fracture.

Some solid materials which are suitable for the second particulate solid material are kaolin, illite, bentonite, flour of silica, carbon and pulverized coal.

If the fractured zone produces oil, the second particulate solid material may be made of oil-soluble materials like napthalene, oil-soluble phenol-aldehyde resins and rosin polymers, so that oil flow through the upper portion of the fracture can dissolve any small plugging solids that tend to block flow in that area of the fracture.

If the methods and compositions of this invention are used to block or reduce water production, it may be desirable to use a water-swellable material like bentonite, flour and starch as the second particulate solid material and an inert carrier fluid. In this manner, any water tending to pass through the packed particles will cause the second particulate material to swell thereby increasing its pore sealing efficiency.

In general, this invention provides a first, particle-form propping solid material which is admixed with a second small particulate material.

Since the first, particle form propping solid material is made up of relatively large, dense particles, a multiple layer pack of solids is quickly and efficiently deposited in the lower portion of the fracture regardless of the flow rate of the fracturing or carrying fluid. The small particles act as pore sealing materials for the larger particles.

Having described the nature of the compositions utilized herein, let us now consider the methods of utilizing these compositions, remembering that the over-all object of this invention is to deposit a pack of solid particles in the lower portion of a vertical fracture, which pack has a permeability less than the permeability through solids deposited in the upper portion of the fracture.

In the preferred embodiment of this invention, the solid plugging type particles composed of propping particles and sealing particles of different composition are carried by a carrier fluid to the fracture where the particles settle in the bottom of the fracture as described previously. In one continuous operation, the deposition of the solid particles is then followed by a carrier fluid containing only propping agent to deposit a propping agent in the upper portion of the fracture and produce a permeable flow channel therein. Preferably, the first phase of the fracturing procedure is to be utilized along with the fracturing techniques disclosed by U.S. patent application, Serial No. 659,496, filed May 16, 1957, in the name of William J. McGuire, Jr., and Loyd R. Kern, now Patent No. 2,950,247, assigned to the same assignee as the present application.

Employing the techniques disclosed therein, immediately after sealing the lower portion of the vertical fracture, a fluid suspension of a manufactured, formable material of generally spherical shape is forced into the upper, unplugged portion of the fracture. The particles have a diameter in excess of 0.03 inch and are capable of supporting a load above 40 pounds per particle without fragmentation. Preferably, the formable material is selected from the group consisting of alumina and aluminum particles and mixtures thereof.

A second form of this invention is to follow the disclosure of U.S. patent application, Serial No. 88,635, now Patent No. 3,164,208, wherein, after the plugging particles of this invention are deposited, there is placed in the unplugged portion of the fracture in a suitable carrier fluid a single layer or less than a single layer of solid, particle-form propping agent of preselected size and strength such that the particles are sparsely distributed in the fracture while maintaining sufficient fracture opening to allow free passage of the fluids therethrough. Preferably, the fracture is initiated with a penetrating fluid to establish the desired pressure and pumping rate. Next, a non-penetrating fluid is injected into the fracture to extend the fracture and to plug the pores in the fracture walls and prevent subsequent leak-off of other fluids injected into the fracture. Thereafter, the plugging solid particles of this invention are deposited in the lower portion of the fracture. After the plugging particles are deposited, a sparse population of propping agent is placed in the unplugged portion of the fracture in a manner described in the foregoing mentioned U.S. patent application, Serial No. 88,635.

The above procedures can also be employed with any other suitable fluid suspension of a propping agent which will produce a propped fracture having a permeability greater than that of the formation itself. For example, conventional fracturing propping sands may be deposited in the top of the fracture under suitable conditions or large-sized, non-crushable propping agents may be utilized in a solid pack or a sparse population. The nature and action of the standard propping agents have been disclosed elsewhere and it is deemed unnecessary to enter into a detailed discussion of these fracture propping agents at this time.

In carrying out the above process, it is frequently desirable to pretreat the walls of the fracture with a fracturing fluid not containing any propping or plugging type solids, but which has a leak-off control agent. Such leak-off control fluid mixtures are well known to the art. The advantages of this pretreatment are largely dependent upon the characteristics of the second particulate solid material of this invention. The pretreatment prevents build-up of a heavy filter cake of small particulate solids on the walls of the upper portion of the fracture. A heavy filter cake of such particles would interfere with the second stage of the fracturing process wherein the desired layer of highly permeable solids is to be placed in the upper portion of the fracture. Normally, this pretreatment would not be necessary if it were not for the second particulate solids of this invention.

A second variation of the above processes involves producing and testing the well before completing the fracturing process. In this process, the formation is fractured and the solid plugging type particles deposited and injection of the fracturing fluid is ceased. Thereafter, the well is produced and the produced fluids tested to determine if there is any increase in production of undesirable fluids, e.g., water in an oil producing well. If the undesirable fluid production is increased, the fracture is re-opened and more plugging material is injected. These plugging and testing steps are repeated until there is no increase in undesirable fluid production caused by the fracturing procedure. Thereafter, the remaining or upper portion of the vertical fracture is propped in a manner as disclosed previously.

In the above process, it may be preferred to prop the upper portion of the fracture after each injection of propping and sealing particles. In this manner, if the production of undesirable fluids is low enough, there will be no need for added treatment. If the production of undesirable fluids is too high, the fracture can be re-opened and a fluid thin enough to cause the propping material to settle from the upper portion of the fracture injected. Thereafter, additional plugging type solid particles will be injected in a manner similar to that already disclosed.

Although the foregoing description was essentially limited to vertical fracturing of oil producing zones which overlie an adjacent water producing zone, it is understood that most of the methods and compositions described herein can be utilized in any vertical fracturing operation where it is desirable to increase the rate of production from or the rate of injection into only the upper portion of the area fractured or to reduce the rate of production from or the rate of injection into the lower portion of a fractured area.

The foregoing description of this invention has described the preferred embodiments of the compositions and methods of this invention, and has set forth certain modifications thereto, but it is understood that all of the modifications have not been described and that further modifications can be suggested by those skilled in the art. This invention intends to cover such modifications.

We claim:

1. A method of propping and at the same time plugging the lower part of a subsurface earth formation fracture, which method comprises passing into said fracture a first mixture of a carrier fluid and a particle-form propping agent having a size greater than the size of the openings of a U.S. Sieve Series No. 60 screen and a particulate sealing material composed of a material different from said particle-form propping agent and having a particle size less than the size of the openings of a U.S. Sieve Series No. 80 screen, said particle-form propping agent having a settling rate in said carrier fluid of at least 0.1 foot per minute whereby the particles of said particle-form propping agent settle to form a pack of said particle-form propping agent in said fracture, said particulate sealing material being present in an amount sufficient to seal openings between the deposited particles of said particle-form propping agent, and thereafter passing into said fracture a second mixture of a carrier fluid containing only fracture propping agent.

2. A method in accordance with claim 1 wherein before the first mixture is passed into the fracture, the method includes the step of passing into the fracture a leak-off control fluid.

3. A method in accordance with claim 1 wherein the volume of the particulate sealing material in the first mixture is between 0.1 and 1.0 times the volume of the particle-form propping agent in said first mixture.

4. A method in accordance with claim 3 wherein at least 30 percent by volume of the particulate sealing material has a size less than the size of the openings in a U.S. Sieve Series screen No. 200.

5. A method in accordance with claim 1 wherein the particulate sealing material is selected from the group consisting of kaolin, illite, flour, starch, bentonite, flour of silica, carbon, resins, and resin polymers.

6. A method in accordance with claim 1 wherein after passing the first mixture into the fracture, there is passed into said fracture a fluid free of particulate matter before the second mixture is passed into said fracture.

7. A method in accordance with claim 6 wherein the particle-form propping agent of the first mixture has a settling rate in the carrier fluid of the first mixture of between 2 and 20 feet per minute.

8. A method in accordance with claim 6 wherein before the first mixture is passed into the fracture, the method includes the step of passing into the fracture a leak-off control fluid.

9. A method in accordance with claim 6 wherein the volume of the particulate sealing material in the first mixture is between 0.1 and 1.0 times the volume of the particle-form propping agent in said first mixture.

10. A method in accordance with claim 9 wherein at least 30 percent by volume of the particulate sealing material has a a size less than the size of the openings in a U.S. Sieve Series screen No. 200.

11. A method in accordance with claim 6 wherein the particulate sealing material is selected from the group consisting of kaolin, illite, flour, starch, bentonite, flour of silica, carbon, resins, and resin polymers.

12. A method in accordance with claim 1 wherein the particle-form propping agent of the first mixture has a settling rate in the carrier fluid of the first mixture of between 2 and 20 feet per minute.

13. A method in accordance with claim 12 wherein before the first mixture is passed into the fracture, the method includes the step of passing into the fracture a leak-off control fluid.

14. A method in accordance with claim 12 wherein the volume of the particulate sealing material in the first mixture is between 0.1 and 1.0 times the volume of the particle-form propping agent in said first mixture.

15. A method in accordance with claim 14 wherein at least 30 percent by volume of the particulate sealing material has a size less than the size of the openings in a U.S. Sieve Series screen No. 200.

16. A method in accordance with claim 12 wherein the particulate sealing material is selected from the group consisting of kaolin, illite, flour, starch, bentonite, flour of silica, carbon, resins, and resin polymers.

References Cited by the Examiner

UNITED STATES PATENTS

| | | | |
|---|---|---|---|
| 2,774,431 | 12/1956 | Sherborne | 166—42 |
| 2,788,072 | 4/1957 | Goodwin | 166—42 |

(Other references on following page)

UNITED STATES PATENTS

| | | | |
|---|---|---|---|
| 2,953,223 | 11/1960 | Harmon | 166—42 |
| 3,046,222 | 7/1962 | Phansalkar et al. | 166—42 |
| 3,075,581 | 1/1963 | Kern | 166—42 |
| 3,127,937 | 4/1964 | McGuire et al. | 166—42 |
| 3,155,159 | 11/1964 | McGuire et al. | 166—42 |

FOREIGN PATENTS 621,081   5/1961   Canada.

CHARLES E. O'CONNELL, *Primary Examiner.*

J. P. ROBINSON, T. A. ZALENSKI,
*Assistant Examiners.*